United States Patent
Pilu et al.

(10) Patent No.: US 8,090,872 B2
(45) Date of Patent: Jan. 3, 2012

(54) VISUAL MEDIA VIEWING SYSTEM AND METHOD

(75) Inventors: Maurizio Pilu, Bristol (GB); Stephen Philip Cheatle, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2119 days.

(21) Appl. No.: 10/628,229

(22) Filed: Jul. 29, 2003

(65) Prior Publication Data

US 2004/0054721 A1    Mar. 18, 2004

(30) Foreign Application Priority Data

Jul. 31, 2002 (GB) .................................. 0217781.4

(51) Int. Cl.
*G06F 15/16* (2006.01)

(52) U.S. Cl. ....................................... 709/246; 709/235

(58) Field of Classification Search .................. 709/246, 709/235

See application file for complete search history.

(56) References Cited

U.S. PATENT DOCUMENTS

| | | | | |
|---|---|---|---|---|
| 5,963,247 | A * | 10/1999 | Banitt | 348/121 |
| 6,496,780 | B1 * | 12/2002 | Harris et al. | 702/3 |
| 6,850,248 | B1 * | 2/2005 | Crosby et al. | 345/428 |
| 6,915,258 | B2 * | 7/2005 | Kontonassios | 704/233 |
| 7,160,113 | B2 * | 1/2007 | McConnell et al. | 434/365 |
| 2002/0140698 | A1 * | 10/2002 | Robertson et al. | 345/427 |
| 2002/0165961 | A1 * | 11/2002 | Everdell et al. | 709/225 |
| 2003/0126195 | A1 * | 7/2003 | Reynolds et al. | 709/203 |
| 2003/0206182 | A1 * | 11/2003 | Kelly et al. | 345/632 |

FOREIGN PATENT DOCUMENTS

| | | |
|---|---|---|
| DE | 100 40 878 A1 | 2/2002 |
| EP | 1 160 703 A2 | 12/2001 |
| JP | 02-233084 | 9/1990 |
| JP | 06-078303 | 3/1994 |

* cited by examiner

*Primary Examiner* — Patrice L Winder

(57) ABSTRACT

A visual media viewing system comprises a server (102) and a viewing unit (106), connected via a network (104). The server (102) includes an image processor (108) and a data storage device (110) for storing visual media data. The viewing unit (106) includes a screen (112) for viewing at least a portion of a piece of visual media and a data storage device (120) for storing visual media data. Both of the respective data storage devices (110,120) are arranged to store data (124) corresponding to the same piece of visual media, locally. The image processor (108) is arranged to select a portion of the piece of visual media automatically and to generate a control data set (126) corresponding to the location of the portion of the visual media within the visual media data (124) and any operations performed thereupon. The server (102) is arranged to transmit the control data set (126) to the viewing unit (106) such that the screen (112) is arranged to display the portion of the piece of visual media that is stored locally. A method of viewing visual media over the network (104) is also disclosed.

26 Claims, 5 Drawing Sheets

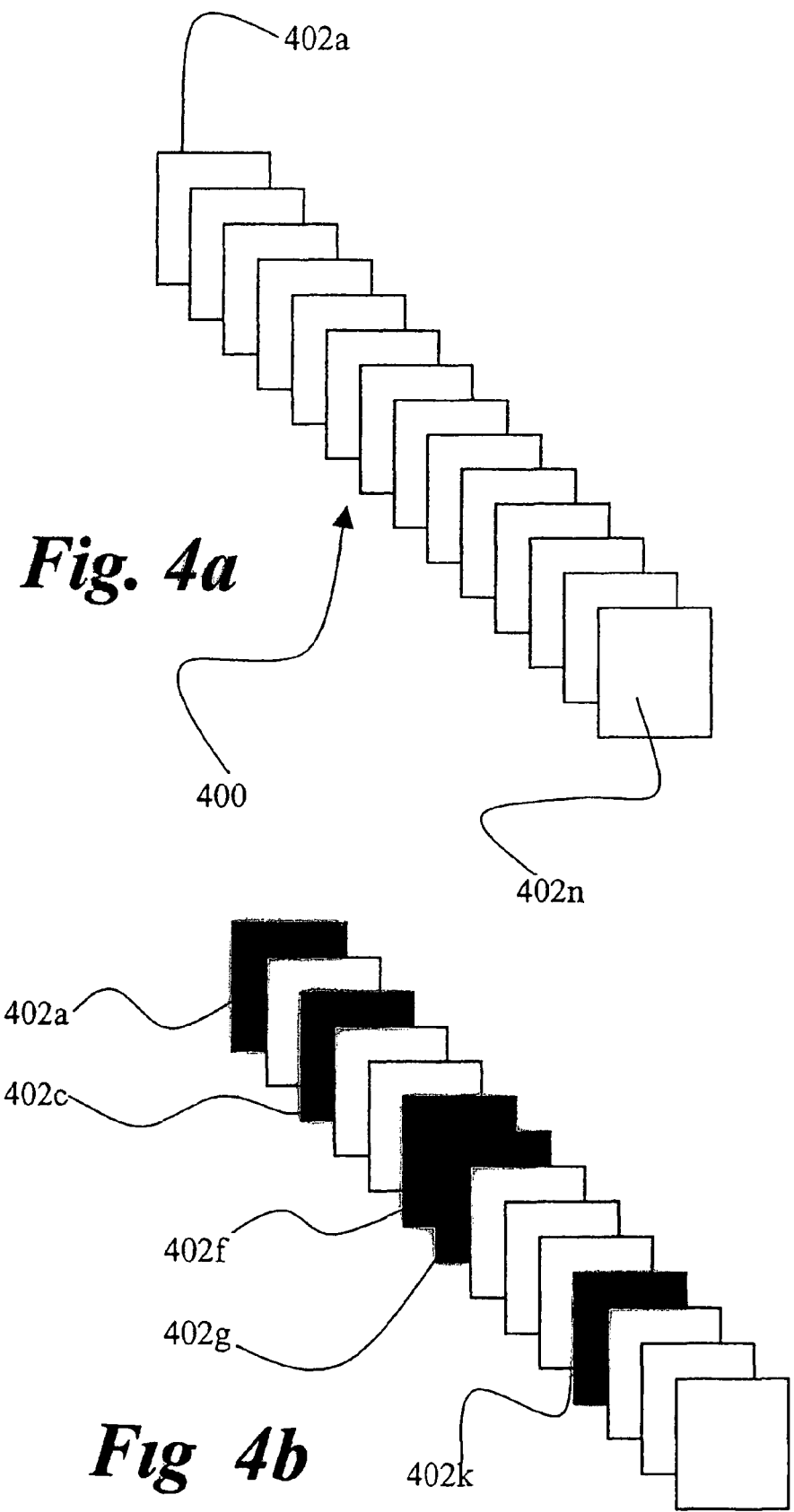

VISUAL MEDIA VIEWING SYSTEM AND METHOD

This invention relates to the viewing of visual media automatically selected at a first network element (image processing device) at at least a second network element (viewing unit) remote from the first network element. More particularly, but not exclusively, the invention relates to a system and method for the viewing of a portion of visual media, selected automatically by the first network element (image processing device), at the at least one second network element (viewing unit).

The sharing of digitised images across networks, for example the Internet, is an increasingly popular way of sharing experiences, such as a holiday or family event. Web albums allow a producer of images to post their digitised images on a website on the Internet from where a consumer can view the posted images using a browser, for example Microsoft™ Internet Explorer™, running on a personal computer (PC) or personal digital assistant (PDA).

Current arrangements for sharing digitised images over a network involve the manual selection of whole images either from a list of available images or a group of thumbnail images. It is possible for a consumer manually to select a feature within the image and, for example, crop and zoom the selected feature in order to show it in more detail. Similarly it is possible to manually edit a video data file in order to reduce its length and remove frames with no interest to the consumer.

Conventional arrangements for the sharing of a detailed view from within an image involve the transfer of the detailed view from an image-processing device over a network to a remote viewing unit. This has the attendant problem that a series of detailed views can not readily be synchronously shared by more than one consumer as at least one consumer is engaged in producing the detailed views and therefore is not free to view the detailed views. Typically, data transfer takes place over a slow speed connection, for example a dial up connection from a consumer's home. The data transfer can take a significant amount of time for each shared image due to the considerable size of both still and video image data files. This can prove expensive for the consumer using a dial up connection.

The automatic generation of views for digital albums, for example by cropping (resizing) within digitised images to remove excess areas containing no, or few, features of interest, or autorostrum (panning) to concentrate on salient feature (s) within an image, is known. This automatic generation of views is computationally intensive and therefore expensive. Also, the automatically generated views must be sent over the network as with manually generated detailed views.

A further consideration is the temporal synchronous viewing of automatically cropped, or otherwise automatically processed, images by more than one consumer. This also includes the sending of synchronisation commands, see for example US 5 7202 161 (still images) and JP 2000-004432 (video), which further utilise available network bandwidths.

According to a first aspect of the present invention there is provided a method of viewing visual media across a network comprising the steps of:
i) storing respective local visual media data corresponding to the same visual media on first and second network elements connected to the network;
ii) creating derived visual media data from the locally stored visual media data with a processing means of the first network element;
iii) automatically generating a control data set representing the derived visual data and corresponding to operations to be performed by a processing means to create the derived visual media data;
iv) transmitting the control data set from the first network element to the second network element via the network;
v) recreating the derived visual data with a processing means of the second network element by use of the control data set; and
vi) displaying the local visual media data in accordance with the derived visual media data upon viewing means of the second network element.

In a preferred arrangement, creating derived visual data comprises selecting a portion of the locally stored visual media data corresponding to a portion of the visual media. It will be appreciated that the invention could also relate to other manipulations of the image data.

According to a second aspect of the present invention there is provided a network element comprising data storage means for storing visual media data, selection means for automatically selecting derived visual media data from the stored visual media data, processing means for processing said derived visual media data, data generation means for generating a control data set and transmission means for transmitting the control data set across a network to a remote network element having a local copy of the visual media data stored thereupon, wherein the control data set includes information corresponding to operations to be performed by a processing means to create the derived visual media data to enable a processor receiving the control data set to recreate the derived visual data for display of the local visual media data in accordance with the derived visual media data.

Again, it is preferred that creating derived visual data comprises selecting a portion of the locally stored visual media data corresponding to a portion of the visual media.

Such a network element, typically a PDA, PC or server, allows the transmission of sufficient data for the remote network element, typically a PDA or PC, to generate an image corresponding to the selected portion of the visual media data from its locally stored copy of the visual media data without transmitting image data itself.

Preferably the control data set is smaller (i.e. takes up less memory space) than the portion of the visual media data and is smaller than a compressed form of the visual media data. This reduces the time delay in the synchronization and interaction between the first and second network elements. It also reduces network bandwidth utilised in the transfer of the control data set compared to the portion of the visual media data which reduces connection times and cost for a consumer. It will therefore be understood that the control data set does not need to, and preferably will not, contain the visual media data.

It will be appreciated that the description of the control data set as being smaller than the portion of the data means that the control data set occupies less digital memory than the portion of the image such that the image can be displayed in a form acceptable for viewing by a consumer.

The selection means may select the portion of the data in response to a prompt from a remote network element. This allows the network element to act as a processor for a remote network element without sufficient processing power to execute visual media data processing, and pass the control data set onward. For example, it is envisaged that a server may receive a request for data from a consumer's computer and automatically generate a view from visual media data stored locally and a control data set relating to the location of, and processing necessary to generate, the view within the visual media data is sent to the consumer's computer where the view is generated from a locally stored copy of the visual media data.

The network element may comprise a viewing means for viewing the automatically selected portion of the visual media data synchronously with the display of the image upon the remote network element.

According to a third aspect of the present invention there is provided a network element comprising receiving means for receiving a control data set from a remote network element across a network, data storage means for locally storing visual media data, processing means for processing the received control data set and the visual media data and display means for displaying an image corresponding to the processed visual media data, wherein the received control data set includes information relating to the location of an automatically selected portion of the visual media data and processing instructions relating to the generation and display of an image of said portion from the locally stored visual media data upon the display means.

This network element typically a PC or PDA generates and displays a portion of a locally stored image in response to a control data set automatically generated by a remote network element typically a PC, PDA or server, without receiving image data directly.

The control data set may include processing instructions relating to the display of the image upon the network element synchronously with the display of the image upon the remote network element.

The control data set may be smaller than the portion of the visual media data. This reduces the time delay in the synchronization and interaction between the first and second network elements. It also reduces bandwidth associated with the transfer of the control data set compared to the portion of the visual media data, which reduces connection times and cost for a consumer.

According to a fourth aspect of the present invention there is provided a visual media viewing system comprising first and second network elements connected over a network;

the first network element including data storage means for storing visual media data, selection means for automatically selecting a portion of the visual media data, processing means for processing said portion of the visual media data, data generation means for generating a control data set and transmission means for transmitting the control data set to the second network element over the network;

the second network element including receiving means for receiving the control data set from the first network element, data storage means for locally storing a copy of the visual media data, processing means for processing the received and the visual media data and display means for displaying an image corresponding to the processed visual media data; wherein the control data set includes information relating to the location of said portion within the locally stored copy of the visual media data and processing instructions relating to the generation and display of the image generated from said portion upon the display means.

This system allows the display of a portion of visual media automatically selected at the first network element upon the display means of the second network element without transferring the selected portion of the visual media data.

Preferably the control data set is smaller than the portion of the visual media data. This reduces the time delay in the synchronization and interaction between the first and second network elements. It also reduces network bandwidth utilised in the transfer of the control data set compared to the transfer of the portion of the visual media data which reduces connection times and cost for a consumer.

The first network element may have display means for displaying the image generated from the portion of the visual media data synchronously with its display upon the display means of the second network element.

According to a fifth aspect of the present invention there is provided a program storage device readable by a machine encoding a program of instructions which when operated upon the machine cause the machine to operate as a network element in accordance with either of the first or second aspects of the present invention.

According to a sixth aspect of the present invention there is provided a personal computer comprising a data storage device for storing visual media data, an image processor for automatically selecting a portion of the visual media data, a central processor for generating a control data set including the location of said portion within the visual media data and information relating to the processing of the data by the image processor, a network interface card for transmitting the control data set, over a network, to a second personal computer having a locally stored copy of the visual media data thereupon and a screen for displaying an image corresponding to the portion of the data synchronously with the second personal computer.

According to a seventh aspect of the present invention there is provided a personal computer comprising a network interface card for receiving a control data set from a remote personal computer across a network, a data storage device for locally storing visual media data, a processor for processing the received control data set and the visual media data and a screen for displaying an image corresponding to the processed visual media data, wherein the received control data set includes information relating to location of an automatically selected portion of the visual media data and processing instructions relating to the generation and display of an image of said portion from the locally stored visual media data upon the screen synchronously with its display upon the remote personal computer.

According to an eighth aspect of the present invention there is provided a network element in accordance with both of the first and second aspects of the present invention.

It will be appreciated that the terms "automatic" and "automatically" as used both hereinbefore and hereinafter in relation to actions executed upon visual media data relate to actions that, once commenced, proceed without the influence of a human operator. This means that whilst criteria for a selection operation may be set by a human operator once the selection operation is in progress it is independent of further outside influence. The selection of features of interest from within an image, for example based upon an operator's input preference, colour matching, or pattern recognition, is carried out upon visual media data without the operator having control over the results of the selection process. This is distinct from prior art arrangements in which features of interest are selected manually and subsequent image processing, for example cropping and zooming is executed automatically.

It will further be appreciated that the term "visual saliency" as used both hereinbefore and hereinafter is taken to mean the discrimination of a feature within in image based upon it prominence in relation to its surroundings.

It will also be appreciated that the term "visual media data" is taken to include either, or both, of digitised still images or, and, digitised video formed from a sequence of frames and, typically, associated audio data which when displayed form a image. Thus the "portion" of the visual media data may be a spatial portion of an image in the case of a still image and may be a either, or combination, of a spatial or/and temporal portion of a digitised video.

The invention will now be described, by way of example only, with reference to the accompanying drawings, in which:

FIG. 4a is a schematic representation of frames from a piece of video media prior to processing by a system of either of FIG. 1 or 2;

FIG. 4b is a schematic representation of a selection of frames of FIG. 4a after processing by a system of either of FIG. 1 or 2.

Figure 1:
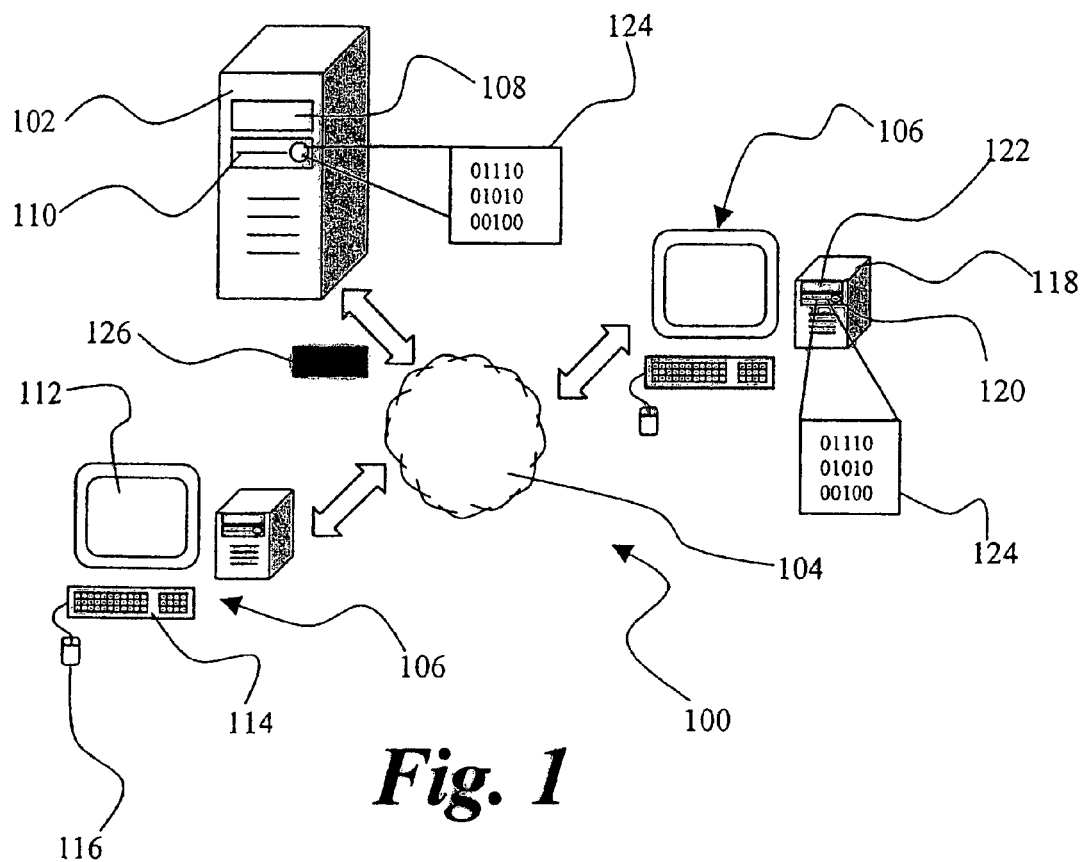
FIG. 1 is a schematic representation of a first embodiment of a system according to an aspect of the present invention.

Referring now to FIG. 1, a visual media viewing system 100 comprises a first network element in the form of a server 102, a network 104 and second network elements in the form of viewing units 106. The server 102 includes an image processor 108 and a storage device 110. The storage device 110 is typically a hard disc drive, RAM, a CD or a DVD. The processor 108 is in communication with the storage device 110.

The viewing units 106 are typically personal computers (PC's) and each includes a screen 112, for example a LCD, TFT or cathode ray display, a keyboard 114, a mouse 116 and a computational unit 118. Alternatively each viewing unit may be a personal digital assistant (PDA), a suitably configured mobile telephone, or a laptop (or palm top) computer. The compute unit 118 contains a storage device 120, typically a hard disc drive, RAM, CD or DVD, and a processor 122. The processor 122 is in communication with the screen 112, the keyboard 114, the mouse 116 and the storage device 120.

The image processor 108 of the server 102 and the processor 122 of the viewing units 106 are in communication with each other via the network 104.

The storage device 110 of the server 102 has a local copy of data 124 corresponding to visual media stored thereupon. The storage devices 120 of the viewing units 106 may have local copies of the data 124 stored thereupon. Alternatively, the storage devices 120 may have copies of the data 124 transferred thereto, either from the server 102 or from an outside source, for example the Internet. Typically, the data 124 will be supplied by a producer such as a magazine photographer or a family member and is typically arranged in a web photo album.

In a first arrangement, the server 102 executes a routine, that may be software or firmware enabled, to generate a single selected view from within a still photograph automatically, using techniques such as cropping, autorostrum, zooming, panning or other visual saliency based techniques, as described hereinafter. The location of the view within the data 124 is recorded. The processor 108 forms a control data set 126 detailing the location of the view within the visual media data 124 and any operations performed upon the data in generating the view, for example cropping, zooming. The control data set can also include details of transitions between a series of views, for example panning within an image, fading between views or dissolving between views. The server 102 passes the control data set 126 to the viewing units 106 over the network 104.

The respective processors 122 of the viewing unit 106 receive the control data set 126 and access the locally stored data 124. The processor 122 execute routines to display an automatically generated view corresponding to the single view generated by the server 102 upon the screen 112. If there is more than one viewing unit 106 connected to the server 102 each viewing unit will display the same automatically generated view synchronously. This allows multiple consumer access to the same automatically generated view synchronously without having to transfer large data files associated with image files.

The server 102 can serve multiple requests for automatically generated views from the same or different visual media data to a number of viewing units 106 via multiple input-output (IO) ports.

In a second arrangement a consumer selects visual media to be displayed typically from a list or a table of thumbnail images by using either, or both, of the keyboard 114 or the mouse 116. The consumer may select a feature, e.g. boats in an image of a harbour, which the processor 108 automatically searches the image for. Alternatively the processor 108 may automatically execute such a search (visual saliency routine). Thus, the processor 108 can automatically generate a series of views from within the consumer-selected image that contain a feature of interest.

Control data sets corresponding to the series of automatically generated views are sent to the viewing units 106 where they are displayed, synchronously and sequentially with the transition between views typically being a pan across the image plane, a so called autorostrum. This arrangement allows consumer to manually change the visual media displayed upon the screen 112 but to autorostrum between automatically generated views within the visual media.

Alternatively, the transition between the automatically generated views can be effected by means of a complex transition such as a simple blending, or a dissolve, between images. This requires that the data relating to the transition is typically generated by the processor 108 and included in the control data set 126. Alternatively, the data relating to the transition can be generated locally by the viewing unit's processor 122.

Figure 2:
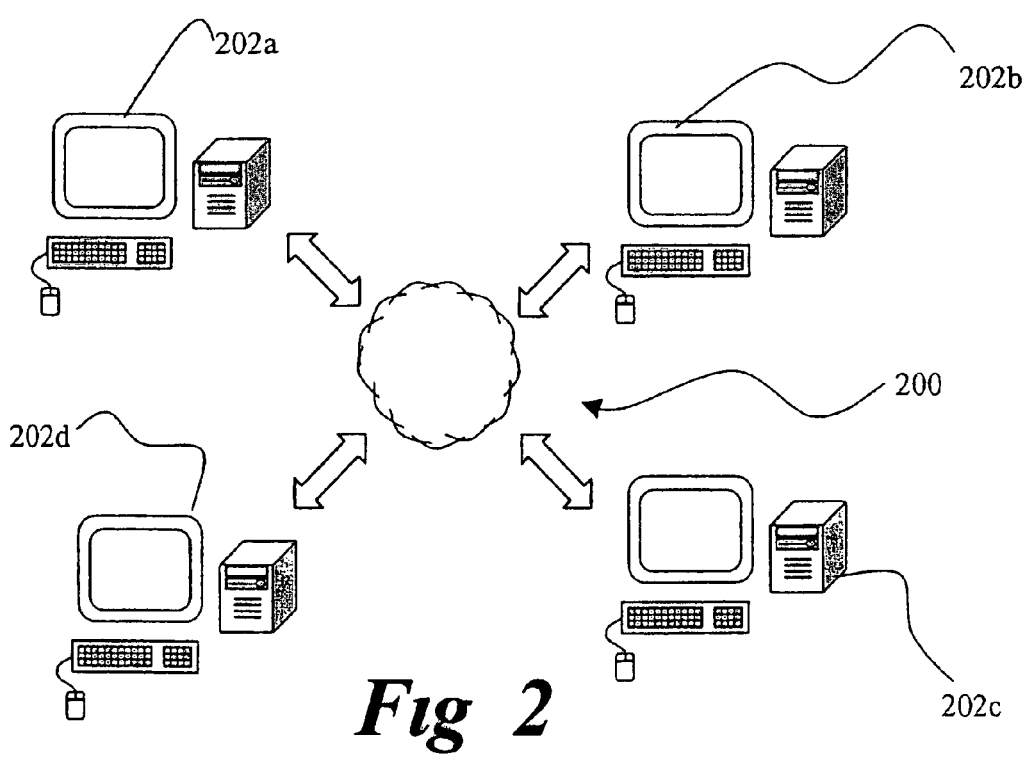
FIG. 2 is a schematic representation of a second embodiment of a system according to an aspect of the present invention.

Referring now to FIG. 2, this shows an alternative embodiment of a networked visual media viewing system 200 where the server 102 of FIG. 1 is replaced by a master viewing unit 202a (first network element) that carries out the functions attributed to the server 102 hereinbefore and also displays the automatically generated views synchronously with slave viewing units 202b-d (second network element).

Figure 3A:
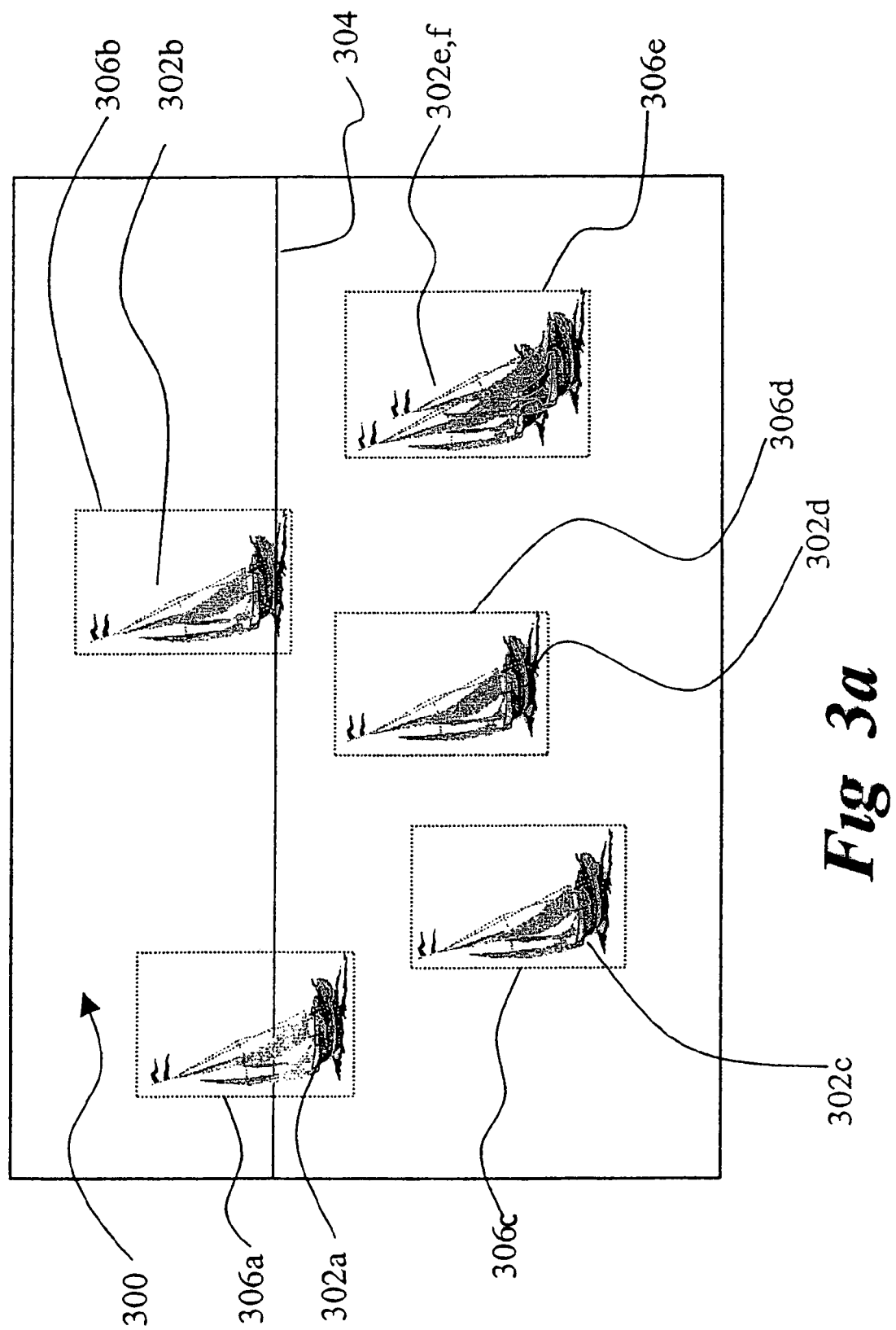
FIG. 3a is a still image prior to processing by a system of either of FIG. 1 or 2.

Referring now to FIG. 3a, this shows a still image 300 of a number of yachts 302a-f and a horizon 304. The server 102 of FIG. 1, (or the master display unit 202a of FIG. 2), executes a visual saliency routine upon the image 300 to extract features of interest. For example, the yachts 302a-f are of interest as they stand out from their background and as such they are shown surrounded by crop boxes 306a-e.

Figure 3B:
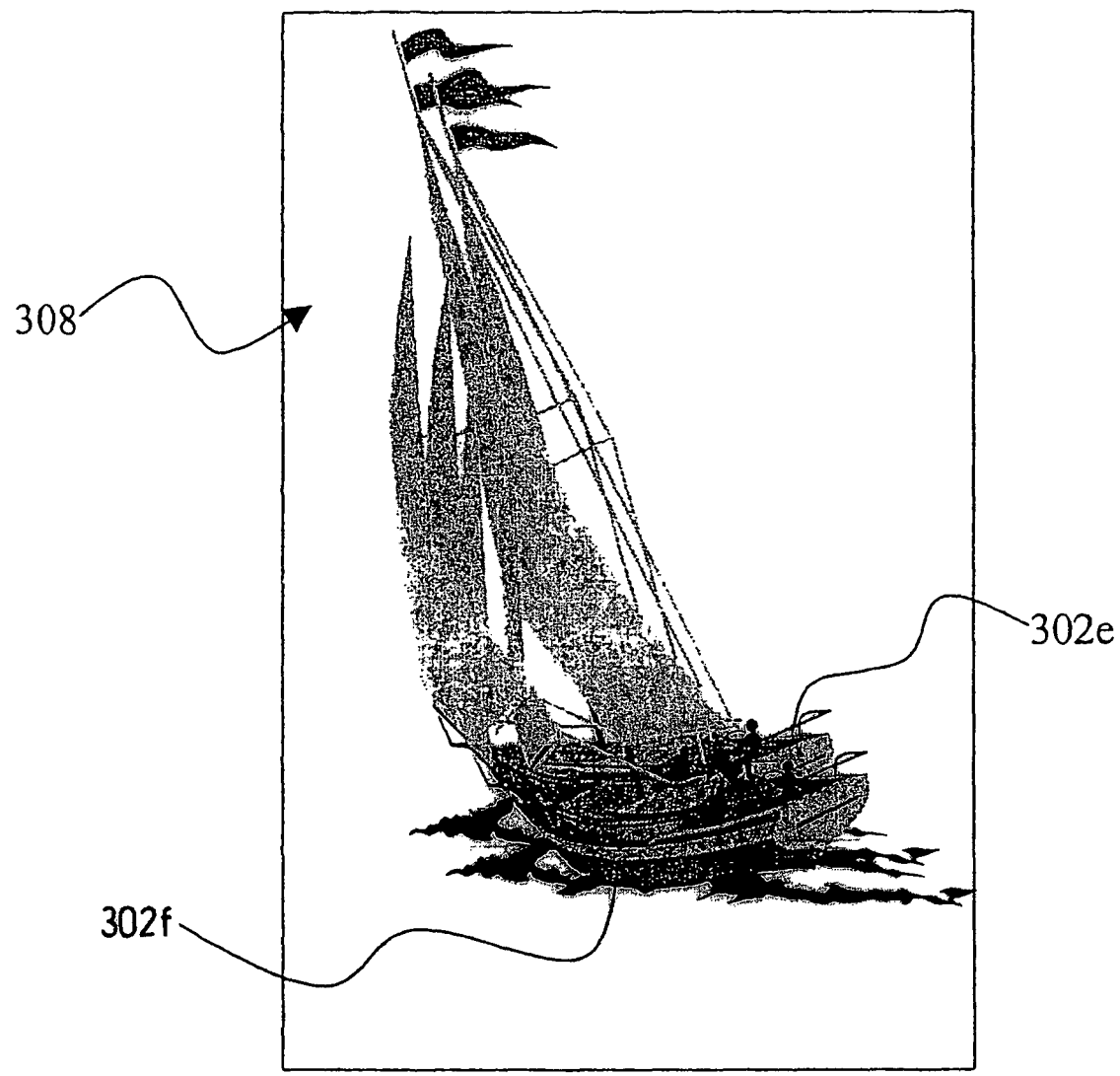
FIG. 3b is a selected view from the still image of FIG. 3a after processing by a system of either of FIG. 1 or 2.

FIG. 3b shows an automatically selected view 308 of the yachts 302e,f once the image has been cropped, excess background removed, and zoomed, magnified to show more details of the yachts 302e,f by either the server 102 or the master viewing unit 202a. It is the location of the crop boxes with the still image 300 and the instructions to crop, zoom etc., that make up the control data set 126 transmitted from, for example, the server 102 to the viewing units 106. The respective processors of the viewing units 106 render the view 308 in response to the contents of the control data set 126 from the copy of the visual media data 124 stored locally upon the storage devices 120. The rendered view 308 is displayed upon the respective screens 112 of the display units 106.

It is also envisaged that the viewing units 106 can move between views within an image by panning between salient features as though a virtual camera were moving across an image plane, autorostruming.

In the case of still image media an initial transfer of media from the server 102 to the viewing units 106 can take place at varying resolutions an data compression ratios using any of the following data types JPEG, Bitmap, TIFF, PDF, Flash PIX™. Typically, the data will be transferred using the transmission control protocol/internet protocol (TCP/IP). However, data may be transferred using the user datagram protocol (UDP) or any other suitable data transfer protocol.

The processor 108 can also execute routines that are arranged to remove redundant or uninteresting frames from video media, see FIGS. 4a and 4b. These routines are typically based on visual saliency techniques. For example, in a crowd scene where one person is wearing a yellow coat, the video processing routine is arranged, to remove frames from the video media that do not contain the shade of yellow that corresponds to that of the coat. This can be carried out either by an automatic routine or in response to a user input, typically from the keyboard 114 or mouse 116. The frame numbers of the frames containing the shade of yellow are formed into the control data set 126 and passed via the network 104 to the viewing units 106. The processors 122 within the respective viewing units 106 access the respective locally stored data 124 from their storage devices 120 and remove the redundant frames in response to instructions contained within the control data set 126 in order to produce a summarised video sub-clip corresponding to that generated by the processor 110 of the server 102. The control data set 126 effectively defines a spatial-temporal rostrum path through the video media. The spatial-temporal rostrum path is a sequence of frames that contain the feature of interest as it varies its position in both space and time.

In the case of video media that has had redundant frames removed, the control data set 126 typically includes automatically generated indexes (keyframes from the video sub-clip), the starting position of the sub-clip within the parent video media and the duration of the sub-clip.

In the case of video media the initial transfer of media data from the server 102 to the display unit 106 will typically take place via real time (time bounded) streaming or MPEG data formats and will usually employ the transmission control protocol/internet protocol (TCP/IP) suite of data communication protocols. Other data transmission protocols can be employed, for example user datagram protocol (UDP).

In the aforementioned arrangements the "master" server 102 generates the control data set 126, containing the commands and information necessary for the "slave" viewing units 106 to synchronously render the automatically generated views from their locally stored copy of the visual media data 124 and sends the control data set 126 to the viewing units 106 via the network 104.

In an alternative arrangement both the server 102 and the viewing units 106 have the routines and algorithms necessary to generate views from within the locally stored visual media data 124 executable by their respective processors 108, 122. The automatically generated views are generated locally at the server 102 and viewing units 106 with the respective processors 108, 122 being synchronised via the network 104. The automatically generated views are then rendered synchronously on the screens 112 of the respective viewing units 106. This allows the parallel processing of the computationally intensive image analysis to produce the parts of the same view and also views of different parts of the visual media. For example, it allows the server 102 to process one view whilst viewing unit 106 processes another different. The control data sets defining the two views can be passed between viewing units 106 to allow their synchronous rendering.

In a still further alternative arrangement the control data set 126 is generated automatically from a feature selected interactively by a user. Typically, this involves sharing an image between the server 102 and the display units 106 for which a number of alternative autocrops have been automatically pre-computed.

A user wishing to crop a region of the image will move a pointer using the mouse 116 over the region of interest. The movement of the mouse 116 is then automatically matched to the available pre-computed autocrops by the server 102 in order to determine which of the autocrops corresponds best to the region of interest. The server 102 generates the control data set 126 and forwards the control data set 126 to the display units 106. The display units 106 synchronously render the automatically generated views from their locally stored copy of the visual media data 124.

The pre-computation of the autocrops relieves the user of the tedious and laborious act of identifying the borders of the crop. The autocrops have been pre-computed which is computationally efficient. It is envisaged that with increased processing power and improved autocropping algorithms it will be possible to execute spontaneous autocropping of images. The autocrop algorithm will be able to take account of the compositional quality of the region of interest whereas simple movement of the mouse will not do so.

Referring now to FIG. 4a, video media 400 is formed from a sequence of frames 402a-n. As described hereinbefore the server 102 or master viewing unit 202a can execute a summarisation routine that carries out, for example, facial recognition, shape recognition, colour recognition, pattern recognition, sound recognition or camera motion patterns and produces a list of frames 402a, c, f, g, k, n that contain the desired feature.

The list is forwarded to the viewing units 106 in the form of the control data set 126 where a sub-clip containing only those frames that include the desired features is compiled from the local copy of the video visual media data 124 by the processor 122 in response to the contents of the control data set 126. The sub-clip is played upon the screens 112 of the respective viewing units 106.

Figure 5:
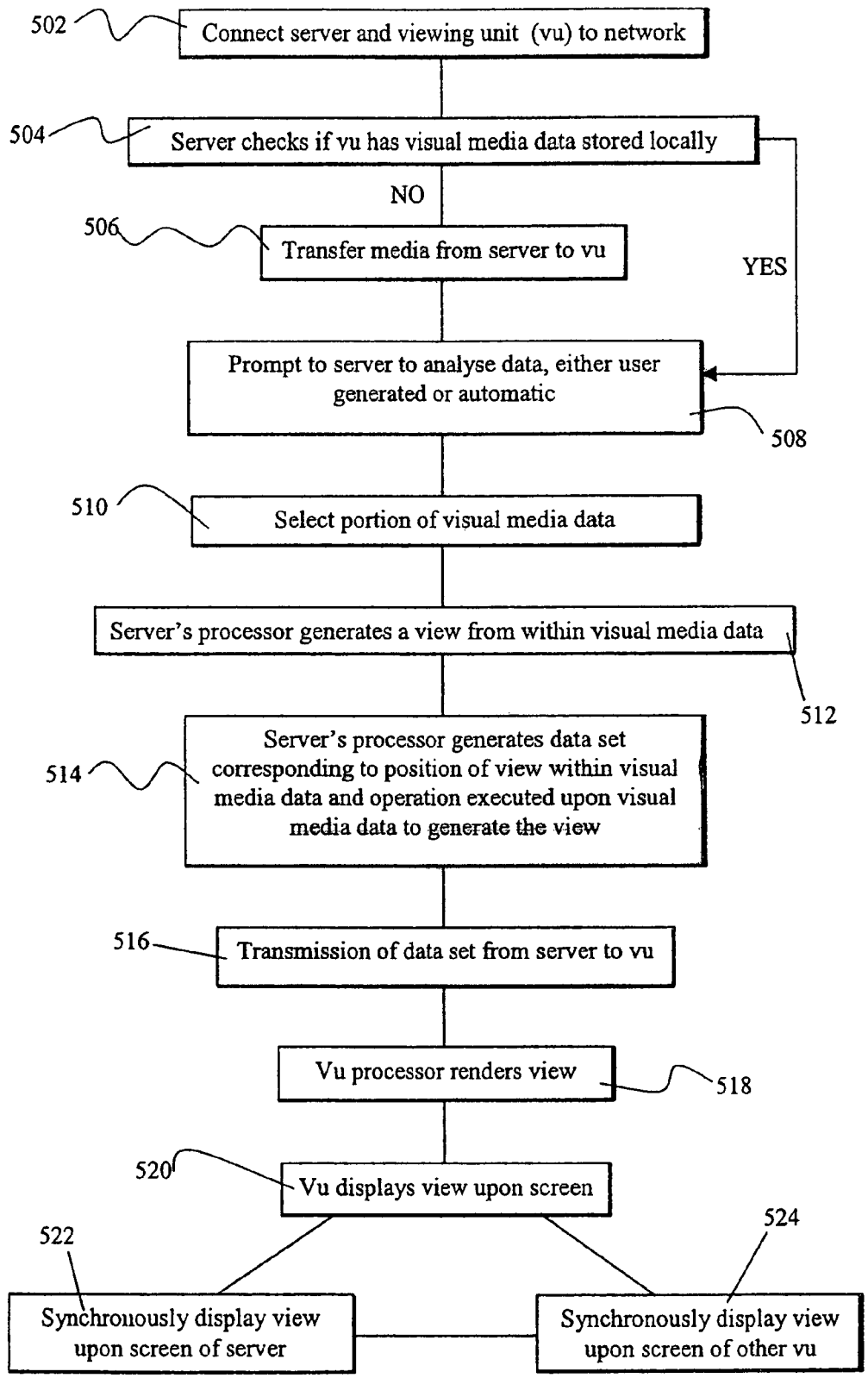
FIG. 5 is a flowchart detailing a method of viewing an image across a network.

Referring now to FIG. 5, a method of viewing visual media across a network comprises connecting a server (or a master viewing unit) having visual media data stored locally thereupon and a viewing unit to the network (Step 502). The server checks to see if the viewing unit has the visual media data stored thereupon (Step 504). If the viewing unit does not have this visual media data stored upon it the server transmits the data to the viewing unit via the network (Step 506) either automatically or in response to a consumer generated prompt. The data transmission typically takes place with the data in a compressed format in order to limit data transmission times.

The server either receives a consumer input or an automatic prompt to analyse the visual media data (Step 508). The server automatically selects a portion of the visual media data stored locally thereupon (Step 510). A processor of the server automatically generates a view based upon the selected portion of the visual media data (Step 512). The processor generates a control data set corresponding to the position of the view within the visual media data and also any operations, for example, cropping or zooming, executed upon the visual media data to generate the view (Step 514).

The server transmits the control data set to the viewing unit (Step 516). The viewing unit's processor renders the view (Step 518) and the view is displayed upon the viewing unit's screen (Step 520). If the server has a screen, or is a master viewing unit, the view is displayed on the screen synchronously with it being displayed on the screen of the viewing unit (Step 522).

If there are a plurality of viewing units the view will be transmitted to them such that the view is displayed synchronously on all of them (Step 524).

The invention claimed is:

1. A method of viewing visual pictorial media across a network comprising the steps of:
   i) storing respective local visual pictorial media data corresponding to the same visual pictorial media on first and second network elements connected to the network;
   ii) creating derived visual pictorial media data from the locally stored visual pictorial media data with a processing means of the first network element;
   iii) automatically generating a control data set representing the derived visual pictorial data and corresponding to operations to be performed by a processing means to create the derived visual pictorial media data;
   iv) transmitting the control data set from the first network element to the second network element via the network;
   v) accessing the local visual pictorial media data stored on the second network element in response to receiving the control data set;
   vi) recreating the derived visual pictorial data with a processing means of the second network element by use of the control data set and the local visual pictorial media data stored on the second network element; and
   vii) displaying the recreated derived visual pictorial media data on viewing means of the second network element.

2. A method according to claim 1 in which the step of creating the derived visual pictorial media is performed automatically.

3. A method as claimed in claim 1, wherein the step of creating the derived visual pictorial data comprises selecting a portion of the locally stored visual pictorial media data corresponding to a portion of the visual pictorial media.

4. The method of claim 3 further comprising displaying the portion of the locally stored visual pictorial media upon viewing means of the first network element substantially synchronously with the displaying of step (vi).

5. A method according to claim 1 in which the visual pictorial media data stored on the first and second elements are identical.

6. The method of claim 1 comprising using visual pictorial saliency techniques to select the portion of the visual pictorial media automatically.

7. The method of claim 1 comprising including in the automatically generated control data set a spatial and temporal locational information detailing a sub-set of video visual pictorial media.

8. The method of claim 1 comprising sharing a rostrum path between the first and second network elements.

9. The method of claim 1 comprising transferring visual pictorial media data from the first network element to the second network element prior to step (i).

10. The method of claim 1 further comprising:
   i) creating further derived visual pictorial media data from the locally stored visual pictorial media data with a processing means of the second network element;
   ii) automatically generating a control data set representing the further derived visual pictorial data and corresponding to operations to be performed by a processing means to create the derived visual pictorial media data;
   iii) transmitting the control data set from the second network element to the first network element via the network; and
   v) recreating the further derived visual pictorial data with a processing means of the first network element by use of the control data set.

11. A visual pictorial media viewing system comprising first and second network elements connected over a network;
   the first network element being arranged for: (a) storing visual pictorial media data, (b) automatically selecting a portion of the visual pictorial media data, (c) processing said selected portion of the visual pictorial media data, (d) generating a control data set related to the selected portion of the visual pictorial media data, and (e) transmitting the control data set to the second network element over the network;
   the second network element being arranged for: (a) receiving the control data set from the first network element, (b) locally storing a copy of the visual pictorial media data, (c) processing the received control data set to access the locally stored visual pictorial media data, (d) recreating the selected portion of the visual pictorial media data on the second network element using the control data set and the locally stored visual pictorial media data, and (e) displaying the recreated selected portion of the visual pictorial media data on a display of the second network element;
   the control data set including (a) information relating to the location of said selected portion within the locally stored copy of the visual pictorial media data and (b) processing instructions relating to recreating and displaying the selected portion on the display of the second network element.

12. A visual media viewing system according to claim 11 wherein the control data set is smaller than the portion of the visual pictorial media data.

13. A visual media viewing system according to claim 11 wherein the first network element has a display for displaying the pictorial image generated from the portion of the visual pictorial media data synchronously with its display upon the display of the second network element.

14. A visual media viewing system according to claim 11 further including a third network element connected to the network, including viewing means and a data store arranged to store said visual pictorial media locally, and the first network element is arranged to transmit the control data set to the third network element such that said viewing means is arranged to substantially synchronously display (a) the portion of the visual pictorial media that are stored locally, with (b) the display of the portion of the visual pictorial media upon the second network element.

15. A network element comprising
   a data store for storing visual pictorial media data,
   a selector for automatically selecting a portion of the stored visual pictorial media data as derived visual pictorial media data,
   a first processor for processing said derived visual pictorial media data,
   a data generator for generating a control data set related to the derived visual pictorial media data, and
   a transmitter for transmitting the control data set across a network to a remote network element having a local copy of the visual pictorial media data stored thereupon, wherein the control data set includes information corresponding to operations to be performed by a second processor of the remote network element to create the derived visual pictorial media data to enable the second processor, in response to receiving the control data set, to access the visual pictorial media data locally stored on the remote network element and recreate the derived visual pictorial data for display at the remote network element.

16. A network element as claimed in claim 15, wherein the information contained in the control data set comprises information relating to the location of a portion within the visual pictorial media data and processing instructions relating to recreating and displaying the derived visual pictorial media data from the local copy of the visual media stored on the remote network element.

17. A network element according to claim 15 wherein the network element comprises a viewer for viewing an automatically selected portion of the visual pictorial media data synchronously with the display of the pictorial image upon the remote network element.

18. A network element according to claim 15 wherein the selector is arranged to automatically select a portion of the visual pictorial media data in response to a user selection of a region of a pictorial image formed from the visual pictorial media data.

19. A network element according to claim 15 wherein the selector is arranged to select, automatically, a portion of the visual pictorial media using a visual saliency technique.

20. A network element according to claim 15 wherein the control data set includes details of transitions between a plurality of automatically selected portions of visual pictorial media.

21. A network element according to claim 15 wherein the selector is arranged to select the portion of the data in response to a prompt from a remote network element.

22. A network element comprising
a receiver for receiving a control data set from a remote network element across a network, wherein the control data set is related to a portion of visual pictorial media data stored on the remote network element,
a data store for locally storing a copy of the visual pictorial media data,
a display for displaying an image stored in the data store,
the received control data set including (a) information relating to the location in the data store of the locally stored visual pictorial media data and (b) processing instructions relating to the recreation and display of a pictorial image of said portion from the locally stored visual pictorial media data on the display, and
a processor coupled with the receiver, data store and display for accessing the locally stored visual pictorial media data in the data store using the location information of the received control data set, recreating the portion of the visual pictorial media data created on the remote network element using the processing instructions of the received control data set and the locally stored visual pictorial media data, supplying the recreated portion of the locally stored visual pictorial media data to the display.

23. A network element according to claim 22 wherein the control data set includes processing instructions relating to displaying the pictorial image on the network element synchronously with displaying a pictorial image on the remote network element, the pictorial image on the remote network element being the same as the locally stored visual media data.

24. A program storage device readable by a machine encoding a program of instructions which when operated upon the machine causes the machine to operate as a network element according to claim 15.

25. A network element comprising
a data store for storing visual pictorial media data,
a processor for (a) automatically selecting a portion of the visual pictorial media data, and (b) generating a control data set including the location of said portion within the visual pictorial media data and information relating to the processing of the data,
a network interface card for transmitting the control data set, over a network, to a second network element, wherein the second network element has a locally stored copy of the visual pictorial media data thereon and a processor for recreating the portion of the visual pictorial media data using the received control data set and the locally stored copy of the visual pictorial media data, and
a screen for synchronously displaying (a) a pictorial image corresponding to the portion of the data with (b) the second network element.

26. A network element comprising
a network interface card for receiving a control data set from a remote network element across a network, wherein the control data set is related to a portion of visual pictorial media data stored on the remote network element,
a data storage device for locally storing a copy of the visual pictorial media data,
a processor for processing the received control data set and the locally stored visual pictorial media data and recreating the portion of the visual pictorial media data stored on the remote network element, and
a screen for displaying the recreated portion of the visual pictorial media data,
the received control data set including (a) information relating to location of an automatically selected portion of the visual pictorial media data and (b) processing instructions relating to recreating and synchronously displaying (a) a pictorial image of said portion from the locally stored visual pictorial media data upon the screen with (b) its display on the remote network element,
the processor being coupled with the network interface card, the screen, the data storage device and the display for causing the screen to automatically display the local selected portion of the visual pictorial media data, synchronously with display of the locally stored visual pictorial media data with display thereof at the remote network element.

* * * * *